June 11, 1963 G. W. FABEL ETAL 3,093,379

PHONOGRAPH TONE ARM

Filed May 11, 1959

Inventors:
George W. Fabel,
Roy Dally,
by Norman C. Fulmer
Their Attorney.

United States Patent Office 3,093,379

Patented June 11, 1963

3,093,379

PHONOGRAPH TONE ARM

George W. Fabel, Auburn, and Roy Dally, Skaneateles, N.Y., assignors to General Electric Company, a corporation of New York Filed May 11, 1959, Ser. No. 812,471

2 Claims. (Cl. 274—23)

This invention relates to phonograph tone arms, and particularly to phonograph tone arms having means for adjusting the stylus pressure.

Phonograph tone arms generally have an elongated shape and are adapted to carry a pick-up cartridge at the forward end thereof, the pick-up cartridge having a downwardly depending stylus which is adapted to engage the groove of a phonograph record. The tone arm usually is provided with pivoting means to provide for vertical and horizontal movement of the forward end with respect to the phonograph record.

Present-day high-fidelity phonograph records are very critical as to the amount of stylus pressure required for optimum performance. Too much stylus pressure results in excessive wear and shortens the life of the record, and if the stylus pressure is insufficient, record wear will be excessive because the stylus will tend to ride up and down the side walls of the record groove instead of remaining at the bottom of the groove, thereby causing excessive wear of the record and distortion of the reproduced audio signal. Also, pick-up cartridges are critical as to the amount of stylus pressure and generally operate best at a particular value of stylus pressure. Different brands of cartridges require different stylus pressures, as recommended by their manufacturers. Typical values of stylus pressures are six grams or less.

Due to the criticalness of the stylus pressure, high-quality tone arms are provided with adjustment means for adjusting the value of stylus pressure. Whenever a new or replacement cartridge is attached to the tone arm, it is generally necessary to adjust the stylus pressure because of a variation in weight among different cartridges. The need for stylus pressure adjustment is enhanced by the common practice of selling tone arms and pick-up cartridges separately so that the purchaser has a choice of cartridges to be used with a particular tone arm. Also, due to rapid advances in the art of pick-up cartridges, it is frequently desirable to replace an obsolete cartridge with a new and improved model.

It is common practice to provide tone arms with springs or weights, which are adjustable, in order to provide for correct stylus pressure. In the past, it has been somewhat difficult and inconvenient to adjust the stylus pressure, because the springs or weights in prior-art tone arms have been difficult or awkward to adjust. Furthermore, the adjustment requires the use of a stylus pressure gauge or scale for measuring the amount of stylus pressure while the adjustment is being made. This, of course, entails the purchasing and keeping of an extra piece of equipment. As a result of this inconvenience of adjusting the stylus pressure of prior-art tone arms, there has been a tendency to neglect to make the proper stylus pressure adjustment, with the result that many records and styli have been ruined or their useful lives been shortened.

An object of this invention is to provide an improved phonograph tone arm which overcomes the above-mentioned drawbacks, and which is so convenient to adjust that the user will be encouraged to set the tone arm for proper stylus pressure.

Another object is to provide a tone arm having means for adjusting the stylus pressure conveniently and accurately without the necessity for using a stylus pressure gauge.

Other objects and advantages of the invention will be apparent from the following disclosure and claims, taken in conjunction with the accompanying drawing.

In accordance with the present invention, a tone arm is provided with two adjustable means for varying the stylus pressure. One of these means is adapted to be adjusted for balancing the tone arm after a cartridge has been attached thereto; i.e., to provide zero pressure at the stylus of the cartridge. The second adjustable means is provided with a calibration scale by means of which it can readily be set to provide a desired amount of stylus pressure. In fact, the tone arm is set to a balanced condition by the first adjustable means and then is set out of the balanced condition by the second adjustable means so as to provide a desired stylus pressure. Preferably, the two adjusting means are in the form of weights which are carried by the tone arm body rearwardly of the horizontal and vertical pivoting means, and are slidable in a lengthwise direction with respect to the elongated tone arm. In a preferred embodiment of the invention, the adjustable counter-weight is mounted on a threaded rod so as to slide along the rod when the rod is manually rotated, and the stylus-pressure adjustment weight is arranged to be manually slidable to a desired position which will provide for the correct stylus pressure.

Figure 1:
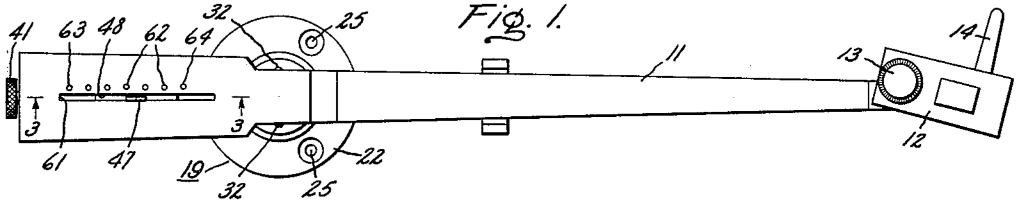
FIG. 1 is a top view of a preferred embodiment of the invention.
Figures 2, 3:
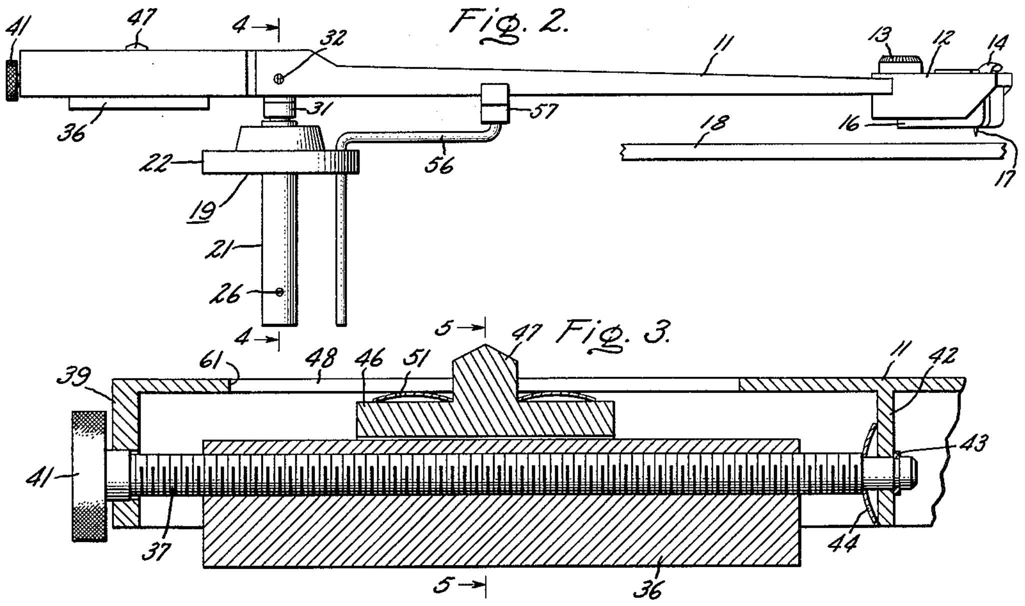
FIG. 2 is a side view of the preferred embodiment of the invention.
FIG. 3 is a partial cross-sectional view, on an enlarged scale, taken on the line 3—3 of FIG. 1.
Figure 4:
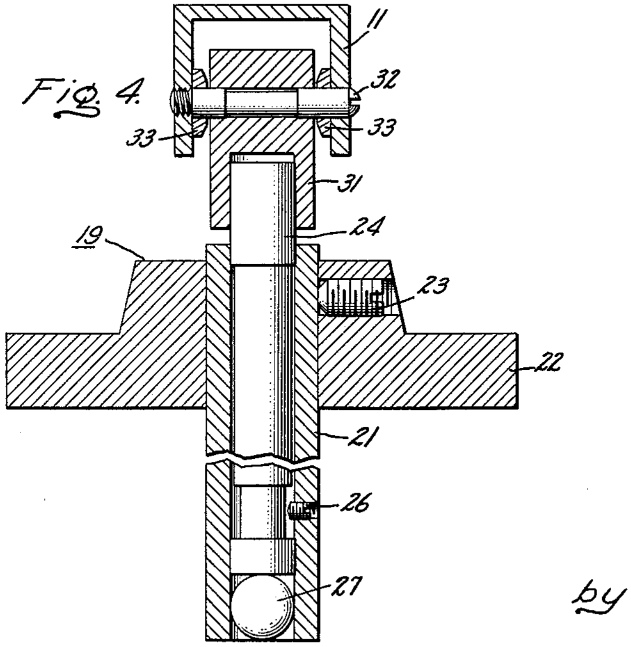
FIG. 4 is a cross-sectional view, on an enlarged scale, taken on the line 4—4 of FIG. 2.

The preferred embodiment of the tone arm in accordance with the invention comprises an elongated body portion 11 which may be a casting of aluminum and preferably is hollow in order to accommodate electrical wiring. The body 11 may be tapered as shown. A removable head 12 is attached to the front end of the body 11 by means of a thumb screw 13, and a finger lift bracket 14 extends from the side of the head 12. The head 12 is adapted to hold a pick-up cartridge 16 having a record-engaging stylus 17 extending downwardly therefrom. The stylus 17 is adapted to engage the groove of a rotatable disc-shaped phonograph record 18, in a well-known manner.

The tone arm is pivotally attached to a mounting assembly 19 consisting of a mounting post 21 and a mounting flange 22 which surrounds the mounting post 21 and is secured thereto in an adjustable relationship by means of a set screw 23. The flange 22 is adapted to be attached to a mounting board by means of screws (not shown) extending through mounting holes 25. A shaft 24 is positioned in the mounting post 21 and is free to rotate therein. The shaft 24 is secured in the mounting post 21 by means of a set screw 26. A ball-shaped thrust bearing 27 is secured in the mounting post 21 by means of a force fit or other suitable means so as to provide a low-friction bearing upon which the shaft 24 rests. A mounting block 31 is attached to the upper end of the shaft 24 by means of a force fit or other convenient means. A pivot shaft 32 extends through openings in the walls of the tone arm body 11 and through a suitable opening in the mounting block 31, and is secured in place by being threaded into one wall of the tone arm. Spacers 33 are positioned between the block 31 and the side walls of the tone arm body 11, and encircle the shaft 32. Preferably, the shaft 32 is made from hardened steel and the mounting block 31 is made of bronze bearing material. The shaft 24 permits the tone arm to swing in a horizontal direction and the shaft 32 permits the tone arm to swing in a vertical direction. As is well-known, these movements enable the tone arm to be manually manipulated so that the stylus 17 will engage and follow the spiral groove of the record 18 when this record is rotated by a suitable turntable.

As shown in the drawing, a portion of the body 11 of the tone arm extends to the rear of the mounting assembly 19 and has a somewhat enlarged cross-section in order to accommodate a stylus balancing mechanism. The stylus balancing mechanism comprises an adjustable balancing weight 36 which is threaded onto an adjustment rod 37. The rod 37 extends through an opening in the rear wall 39 of the body and is provided with a knurled knob 41 which is adapted to be turned manually. One end of the threaded rod 37 is journalled in an opening in the rear wall 39 of the tone arm body member and the other end of the threaded rod 37 is journalled in an opening through a rib 42 which extends between the walls of the body 11. A lock ring 43 is provided to maintain the threaded rod 37 in proper position, and a take-up spring 44 is provided to prevent or reduce any axial play of the threaded rod 37 with respect to the tone arm body 11.

Figure 5:
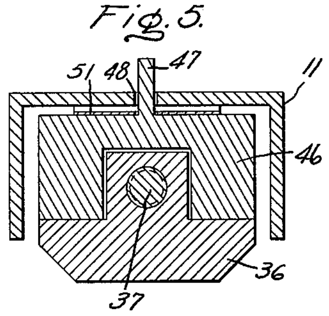
FIG. 5 is a cross-sectional view taken on the line 5—5 of FIG. 3.

An adjustable stylus pressure weight 46 also is provided in the enlarged portion of the tone arm body 11 and is manually movable along the axis of the body 11. The adjustable stylus pressure weight 46 is provided with a tab 47 which extends upwardly through an elongated slot 48 in the upper surface of the enlarged portion of the body 11. As shown in FIG. 5 of the drawing, the adjustable weights are shaped so that the stylus pressure weight 46, having an inverted U-shaped cross-section, straddles the balancing weight 36, the mating surfaces of these weights being mutually parallel so that the weights can slide with respect to each other. A leaf spring 51 is positioned between the stylus pressure weight 46 and the upper wall of the body 11, in order to prevent undue play between these parts. The walls of the body 11, and the tab 47 in the slot 48, prevent the assembly of balancing weights 36 and 46 from rotating when the threaded rod 37 is rotated.

An arm rest 56 is formed from an elongated member which is bent to extend through an opening in the mounting flange 22. The arm rest 56 extends generally forwardly from the mounting flange 22, and terminates at a bracket 57 which is suitably shaped and positioned for the tone arm to be rested upon when not in use.

The stylus pressure is adjusted as follows. After the cartridge 16 is in place in the tone arm, the knob 41 is turned manually, thereby causing the weight 36 to slide axially, until the tone arm (including the cartridge) is balanced. The point of balance is easily determined, either visually or by feel, and is the condition at which the tone arm balances horizontally or at which the stylus 17 has zero pressure with respect to the phonograph record 18. At this balanced condition, the tab 47 must be positioned at the rear end 61 of the slot 48. To obtain the desired stylus pressure, the tab 47 is manually moved forwardly, thereby moving the weight 46 forwardly, to the proper position as indicated by a scale 62 alongside the slot 48. The preferred scale 62 comprises a series of marks spaced at one-gram intervals of stylus pressure. Thus, the rearmost mark 63 represents zero grams, and the seventh or frontmost mark 64 represents six grams of stylus pressure. In FIG. 1, the tab 47 is shown at the 3½ gram setting of stylus pressure. Since the weight 46 functions exclusively to provide a desired stylus pressure, it is of relatively light weight, and is movable over a long enough distance, so that the scale 62 is accurate and easy to read. The weight 36, on the other hand, functions exclusively to balance the tone arm, and hence does not require any scale for accurate functioning and can be relatively heavy so as to be capable of balancing a large range of cartridge weights. Since the stylus pressure weight 46 functions with respect to a balanced reference condition, the calibration scale 62 is accurate regardless of the weight of the cartridge 16.

From the foregoing disclosure, it will readily be appreciated that we have achieved a tone arm which provides convenient means for quick and accurate adjustment of stylus pressure without the necessity of resorting to the use of a stylus pressure gauge. Variations and modifications of the preferred embodiment of the invention will occur to those skilled in the art, which variations and modifications will fall within the scope of invention as defined in the following claims.

What we claim as new and desire to secure by Letters Patent of the United States is:

1. In a phonograph tone arm comprising a hollow elongated member adapted to carry a pick-up cartridge at the forward end thereof, said cartridge having a stylus, and said tone arm further comprising support means for pivotally supporting said elongated member intermediate the ends thereof, stylus pressure adjustment means comprising first and second weights adjustable in a direction along the length of said tone arm within the portion of said elongated member which is at the rear of said support means, a threaded rod arranged for manual rotation to drive said first weight to a position to place said tone arm in a balanced condition when carrying said pick-up cartridge, an elongated slot in the wall of said elongated member at said portion thereof which is at the rear of said support means, said elongated slot extending in a direction along the length of said tone arm, and a tab extending from said second weight through said slot to permit manual adjustment of said second weight to a position to set said tone arm out of said balanced condition at least to an extent whereby said stylus acquires a desired pressure for engaging a phonograph record.

2. In a phonograph tone arm comprising a hollow elongated member adapted to carry a pick-up cartridge at the forward end thereof, said cartridge having a stylus, and said tone arm further comprising support means for pivotally supporting said elongated member intermediate the ends thereof, stylus pressure adjustment means comprising first and second weights adjustable in a direction along the length of said tone arm within the portion of said elongated member which is at the rear of said support means, a threaded rod arranged for manual rotation to drive said first weight to a position to place said tone arm in a balanced condition when carrying said pick-up cartridge, an elongated slot in the wall of said elongated member at said portion thereof which is at the rear of said support means, said elongated slot extending in a direction along the length of said tone arm, stylus pressure calibration marks arranged alongside said slot, and a tab extending from said second weight through sail slot to permit manual adjustment of said second weight to a position to set said tone arm out of said balanced condition at least to an extent whereby said stylus acquires a desired pressure as indicated by said calibration marks for engaging a phonograph record, said first weight being elongated in said direction along the length of said tone arm, and said second weight having an inverted U-shaped cross-section and being arranged to straddle said first weight in slidable engagement therewith.

References Cited in the file of this patent

UNITED STATES PATENTS

| | | |
|---|---|---|
| 1,560,231 | Hand | Nov. 3, 1925 |
| 1,742,085 | Kuchenmeister | Dec. 31, 1929 |
| 2,532,803 | Faus | Dec. 5, 1950 |
| 2,884,256 | Proctor | Apr. 28, 1959 |
| 2,993,698 | Stanton | July 25, 1961 |

FOREIGN PATENTS

| | | |
|---|---|---|
| 585,543 | Great Britain | Feb. 11, 1947 |